US006776514B2

(12) United States Patent
Murakami

(10) Patent No.: US 6,776,514 B2
(45) Date of Patent: Aug. 17, 2004

(54) VEHICLE LAMP

(75) Inventor: Tomokazu Murakami, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/376,805

(22) Filed: Feb. 28, 2003

(65) Prior Publication Data

US 2003/0174510 A1 Sep. 18, 2003

(30) Foreign Application Priority Data

Mar. 13, 2002 (JP) ....................................... 2002-067892

(51) Int. Cl.[7] .................................................. B60Q 1/02
(52) U.S. Cl. ........................ 362/509; 362/539; 362/351
(58) Field of Search ................................. 362/351, 343, 362/538, 539, 509, 518, 547, 516, 255, 345

(56) References Cited

U.S. PATENT DOCUMENTS 5,567,033 A 10/1996 Tanaka et al.
5,782,550 A 7/1998 Ohashi et al.
5,971,575 A 10/1999 Matubara
6,079,860 A 6/2000 Ito
6,132,068 A 10/2000 Katsumata
6,203,177 B1 3/2001 Watanabe et al.
6,238,072 B1 5/2001 Eto

*Primary Examiner*—Thomas M. Sember
(74) *Attorney, Agent, or Firm*—Koda & Androlia

(57) ABSTRACT

A vehicle lamp including a reflector, which has a light source and is housed in a lamp chamber defined by a lamp body and a front lens, and a shade, which is attached at its first and second legs to the reflector so as to be in front of the light source. The first leg is fastened to the reflector by a screw; and the second leg is connected to the reflector by an engaging piece of substantially an L-shape that is formed at an end of the second leg and is engaged with an engaging hole formed in the reflector. The engaging piece extends from shoulder portions of the second leg, and the length between the shoulder portions to a head portion at the tip end of the engaging piece is set to be substantially equal to the longitudinal length of the engaging hole of the reflector.

4 Claims, 5 Drawing Sheets

VEHICLE LAMP

BACKGROUND OF THE INVENTION

1. Field of the Invention

The present invention relates to a vehicle lamp and more particularly to a vehicle lamp that includes a shade disposed in front of the light source via its leg portion attached to the reflector.

2. Prior Art

One of known vehicle lamps includes a shade that is provided in front of the light source by way of attaching the leg portion of the shade to a reflector. More specifically, the leg portion of the shade is comprised of a pair of legs that extend backward, and one of the legs is screw-fastened to the reflector and the other leg is brought to engage with an engaging hole formed in a reflector so as to be secured therein and prevented from being separated.

As seen from FIG. 7, in such a vehicle lamp as described above, a shade 6 is provided in front of a light source 4, which is mounted on a reflector 1. The shade 6 has a pair of legs 7*a* and 7*b*. The leg 7*a* is screw-fastened to the reflector 1, and the leg 7*b* is secured by being engaged with an engaging hole 2 formed in the reflector 1. The tip portion 7*b*1 of the leg 7*b* is bent so that the leg 7*b* does not rattle with respect to the engaging hole 2 due to vibrations and the like of the vehicle.

However, in this conventional vehicle lamp, a bending process of the tip portion of the leg 7*b* that is inserted in the engaging hole 2 is necessary, and this leads to a problem that it takes time to attach the shade 6. The tip portion 7*b*1 of the leg 7*b* can be bent in advance, thus eliminating the bending process of the tip portion after insertion. However, with a shade that has a bent tip portion, it is very difficult to engage the leg 7*b* with the engaging hole.

SUMMARY OF THE INVENTION

Accordingly, the object of the present invention to provide a vehicle lamp in which the shade is easily attached to the reflector and looseness is not generated on the attachment portion of the shade.

The above object is accomplished by a unique structure for a vehicle lamp that comprises a reflector, which is provided with a light source and is housed in a lamp chamber defined by a lamp body and a front lens, and a shade, which is attached at a leg portion thereof to the reflector so as to be in front of the light source; and in the present invention,

- the leg portion of the shade is comprised of a first leg and a second leg that extend backward respectively so as to sandwich the light source; and
- the first leg is screw-fastened to the reflector, and
- the second leg is connected to the reflector by a substantially L-shaped engaging piece that is formed at a tip portion of the second leg and engaged with a peripheral area of an engaging hole formed in the reflector thus being secured therein so as not to be separated from the engaging hole, the substantially L-shaped engaging piece extending from shoulder portions of the second leg, and the longitudinal length between the shoulder portions to a head portion at the tip end of the engaging piece being substantially equal to the longitudinal length of the engaging hole of the reflector.

In the above structure, by way of rotating the shade, that is, the engaging piece, the engaging piece can be easily inserted into the engaging hole of the reflector; and the head portion of the inserted engaging piece supports in a sandwiching manner the peripheral portion of the engaging piece in a longitudinal direction in coordination with the shoulder portions of the second leg. Thus, the leg portion is secured without looseness with respect to the engaging hole and is thus prevented from being separated.

Furthermore, in the above structure, the width of a mounting base portion of the engaging piece is set to be substantially equal to the width of the engaging hole of the reflector, and one side of the head portion of the engaging piece is formed diagonally to form a slanted edge that allows the engaging piece to be smoothly inserted into the engaging hole.

When the engaging piece is brought to be inserted into the engaging hole of the reflector, this is done by way of rotating the shade. As a result, the slanted edge ensures a smooth insertion of the engaging piece into the engaging hole of the reflector.

The right and left side peripheral areas of the mounting base portion of the engaging piece abuts against the inner peripheral surface of the engaging hole of the reflector, and thus the engaging piece is secured in the engaging hole without causing looseness in the lateral direction with respect to the engaging hole.

Furthermore, in the vehicle lamp of the present invention,

- the shoulder portions are provided on both sides of the engaging piece, and
- one of the shoulder portions which is opposed to another one of the shoulder portions that faces the head portion of the engaging piece is formed in a square shouldered shape inclined toward the direction perpendicular to the direction in which the engaging piece extends.

Since one of the shoulder portions has a square shouldered shape, only the tip portion of such a shoulder portion abuts against the peripheral area of the engaging hole. As a result, a dimensional error which occurs when the substantially L-shaped engaging piece is engaged with the peripheral area of the engaging hole is absorbed. In addition, the peripheral area of the engaging hole is supported in a sandwiched manner in the longitudinal direction by the head portion of the engaging piece and the right and left shoulder portions, in a coordinated manner. In one of the shoulder portions that has the square shouldered shape, only the tip portion of the acute-angled shoulder portion abuts against the peripheral area of the engaging hole. As a result, the holding force on the peripheral area of the engaging hole with respect to the engaging piece is enhanced.

DETAILED DESCRIPTION OF THE INVENTION

Figure 1:
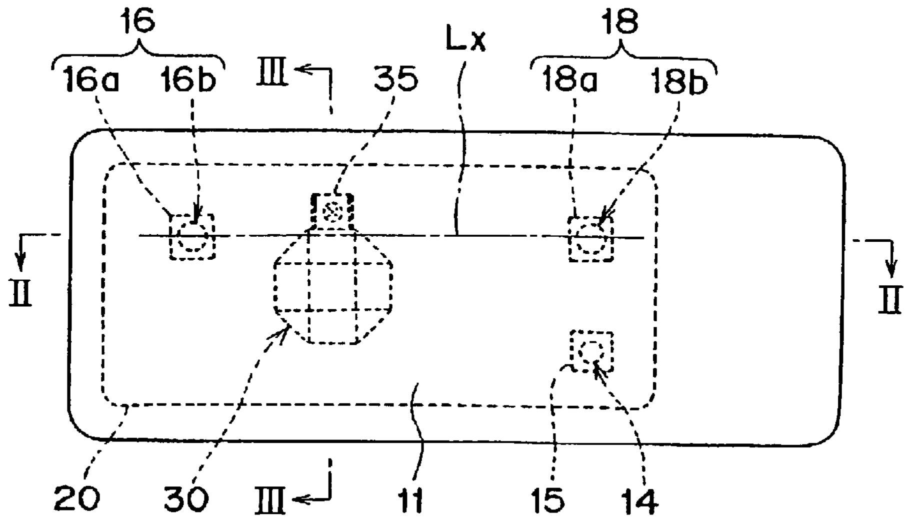
FIG. 1 is a front view showing the front of a fog lamp according to one embodiment of the present invention.

The present invention will be described in detail by way of the embodiments with reference to the accompanying drawings.

The present invention will be described on a fog lamp used in a vehicle.

The fog lamp is housed in an opening portion B1 of a front bumper B, and it has a shape shorter in the vertical direction and longer in the lateral direction. A front lens 11 is provided on the front opening portion of a container-like lamp body 10, thus forming a lamp chamber S. In the lamp chamber S, a reflector 20 that has a light source is supported so as to be tiltably moved by one aiming screw 14 and two ball joints 16 and 18 that constitute an aiming mechanism.

Figure 2:
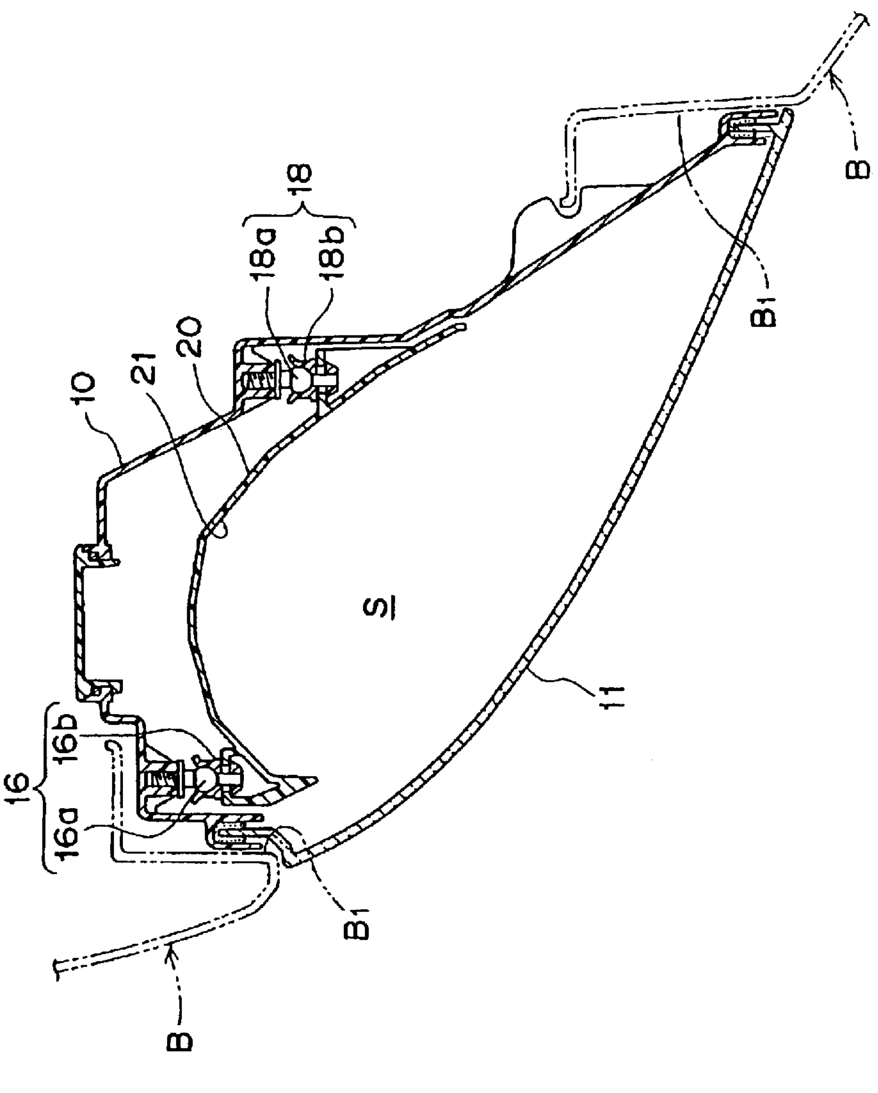
FIG. 2 is a horizontal cross sectional view (a cross section taken along the line II—II in FIG. 1) of the fog lamp.

The aiming screw 14 is rotatably supported by a screw insertion hole (not shown), which is provided in the rear wall of the lamp body 10 and extends forward at a position closer to the inner side in the vehicle width direction when the lamp is viewed from the front. The front end of the screw 14 is screwed to a nut 15 (see FIG. 1), which is fitted into the back side of the reflector 20. The ball joint 16 is comprised of a ball element 16*a*, which protrudes from the rear wall of the lamp body 10, and a ball bearing 16*b* which is fitted in a bracket on the back side of the reflector 20 and supports the ball element. The ball joint 18 is comprised of a ball element 18*a*, which protrudes from the rear wall of the lamp body 10, and a ball bearing 18*b* which is fitted in a bracket on the back side of the reflector 20 and supports the ball element 18*a*. The ball joints 16 and 18 are provided on the same (height) level when viewed from the front (see FIGS. 1 and 2).

Figure 3:
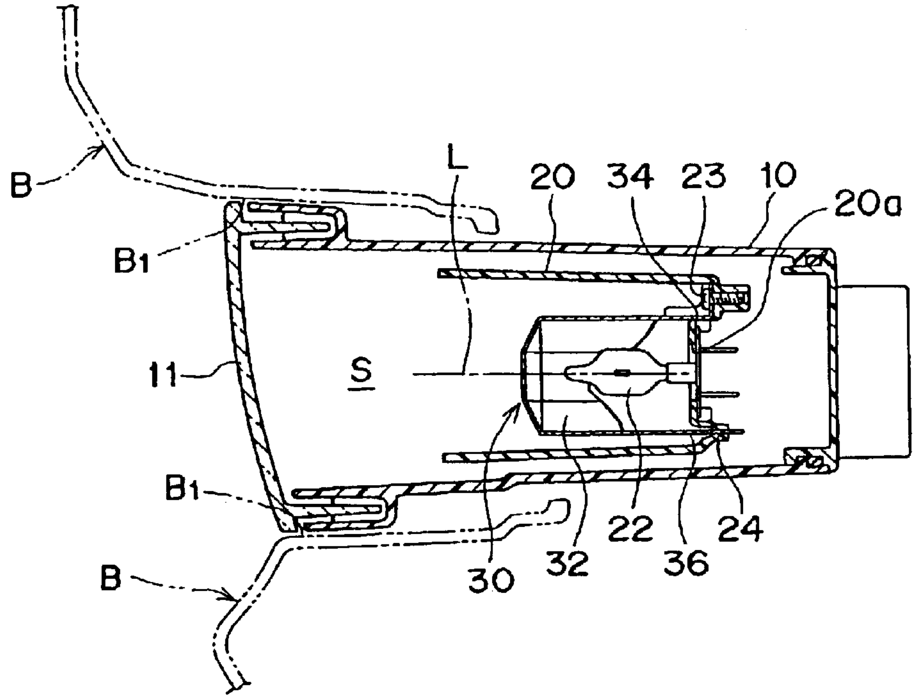
FIG. 3 is a longitudinal cross sectional view (a cross section taken along the line III—III in FIG. 1) of the fog lamp.
Figure 4:
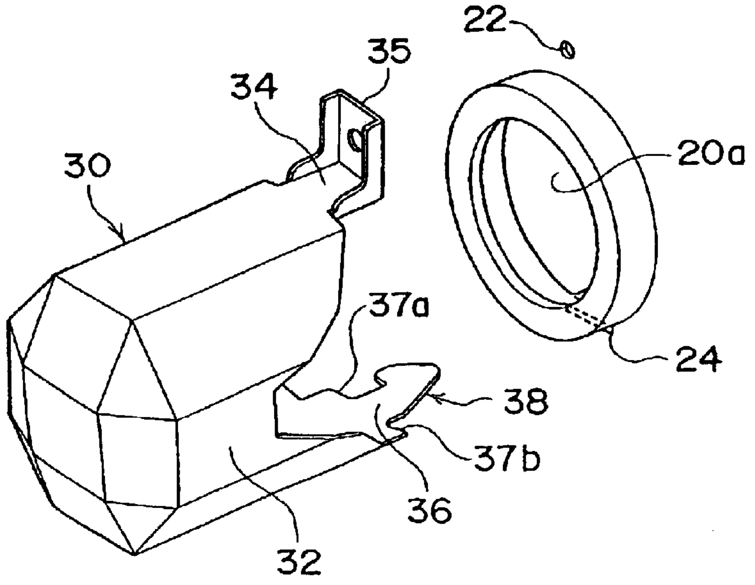
FIG. 4 is an enlarged perspective view of the shade used in the fog lamp.

The nut 15 is moved back and forth along the screw 14 when the screw 14 is rotated, and the reflector 20 is tiltably moved around a horizontal axis Lx that passes through the ball joints 16 and 18. The optical axis L (see FIG. 3) of the lamp is thus adjusted (for aiming) in the vertical direction.

An effective multiple reflective surface 21 is formed on the front surface of the reflector 20 which is supported by the aiming mechanism; and a bulb 22, the light source, is set in a bulb insertion hole 20*a* formed in the back top portion of the reflector 20.

A shade 30 made of a metal is provided in front of the bulb 22 with its leg portion attached to the reflector 20. The shade 30 shields the light directed toward a region except the effective multiple reflective surface 21 of the reflector 20, thus preventing a glare light. The shade 30 is comprised of a cap type shade body 32, which is disposed in front of the bulb 22, and a pair of legs 34 and 36, which respectively extend backward from the shade body 32.

The legs 34 and 36 (or the first leg 34 and the second leg 36) are provided on the upper and lower sides respectively so as to oppose diametrically from each other with respect to the bulb 22. The tip portion 35 of the upper side (first) leg 34 is bent at substantially right angles outward and upward and is fastened by a screw 23 to a boss hole 22 formed in the reflector 20. On the other hand, in the lower side (second) leg 36, a substantially L-shaped engaging piece 38 is formed so as to extend from the right and left shoulder portions 37*a* and 37*b* which are at the tip portion of the lower side leg 36. The engaging piece 38 is engaged with an engaging hole 24 formed in the reflector 20 so as to be secured therein and prevented from being separated.

Figure 5:
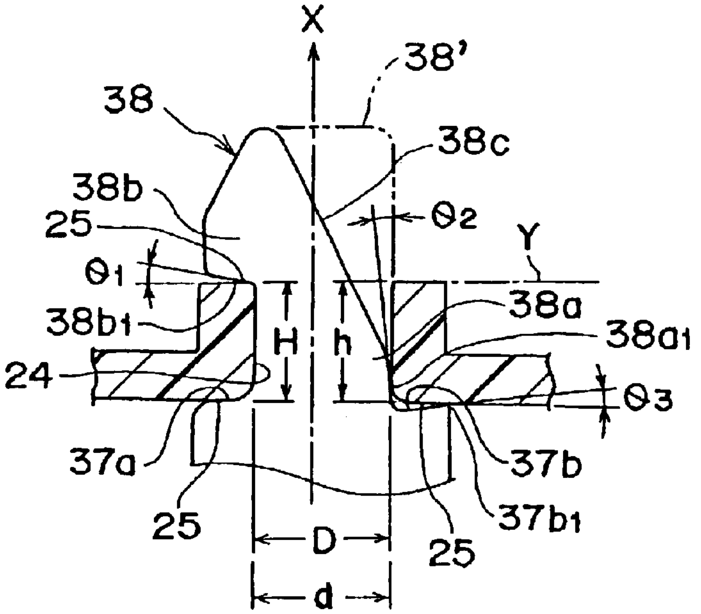
FIG. 5 shows the state in which the engaging piece at a tip portion of the leg of the shade is engaged with an engaging hole of the reflector.

More specifically, the substantially L-shaped engaging piece 38, as seen from FIG. 5, is comprised of a neck portion 38*a* and a head portion 38*b*. The neck portion 38*a* is located on a mounting base side of the engaging piece 38 and is formed continuously from the right and left shoulder portions 37*a* and 37*b*. The head portion 38*b* is located on a tip portion side of the engaging piece 38 and is formed continuously from the neck portion 38*a*.

The longitudinal length H from the shoulder portions 37*a* and 37*b* to the head portion 38*b* is formed so as to be substantially equal to the longitudinal length h of the engaging hole 24 of the reflector 20. The head portion 38*b* and the shoulder portions 37*a* and 37*b* support in a sandwiching manner the peripheral area 25 of the engaging hole 24 in the longitudinal direction, thus securing the engaging piece 38 inside the engaging hole 24 without looseness in the longitudinal direction, and preventing the engaging piece 38 from being separated from engaging hole 24.

The width D of the mounting base portion 38*a*1 of the neck portion 38*a* of the engaging piece 38 is formed so as to be substantially equal to the width d of the engaging hole 24. The mounting base portion 38*a*1 of the neck portion 38*a* inserted in the engaging hole 24 abuts against the inner peripheral surface of the engaging hole 24, thus securing the engaging piece 38 without looseness in the lateral direction with respect to the engaging hole 24.

One side of the head portion 38*b* of the L-shaped engaging piece 38 is formed diagonally, thus making a slanted edge 38*c*. The substantially L-shaped engaging piece 38 is thus inserted into and engaged with the engaging hole 24 of the reflector 20 smoothly. If the engaging piece 38 has a right-angled corner as shown by the imaginary lines in FIG. 5, and such an engaging piece is to be inserted into the engaging hole 24 of the reflector 20, the outer side of the L-shaped right-angled corner of the engaging piece inhibits the insertion even if the engaging piece (that is, the shade) is rotated when insertion is attempted and even if the engaging piece 38 is pushed straight when insertion is attempted.

Figure 6:
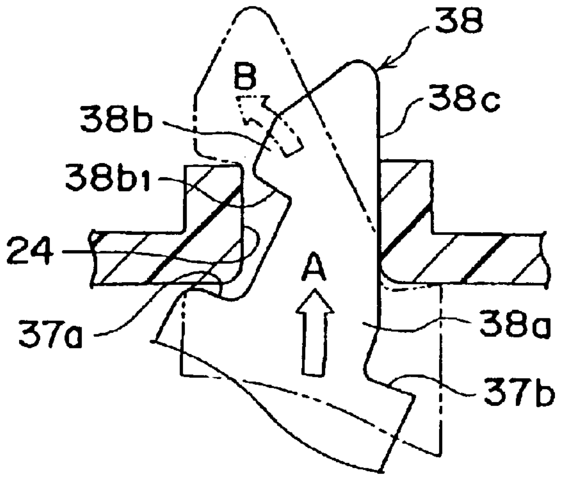
FIG. 6 illustrates how the engaging piece the leg of the shade is engaged with the engaging hole of the reflector.
Figure 7:
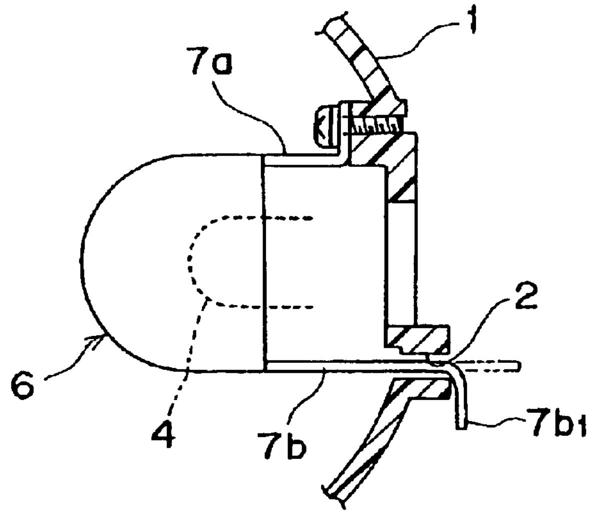
FIG. 7 PRIOR ART
FIG. 7 shows in cross section the attachment portion of the shade in a conventional lamp.

However, in the shown embodiment, one side of the head portion of the engaging piece is formed (by cutting, for instance) diagonally so as to form the slanted edge 38*c*. Accordingly, as shown by arrow a in FIG. 6, the engaging piece 38 is first brought into the engaging hole 24 diagonally with respect to the slanted edge 38*c* so that the slanted edge 38*c* is consistent with the opening direction of the engaging hole 24 (longitudinal direction). When the tip portion of the head portion 38*b* has passed through the engaging hole 24, the engaging piece (the shade) 38 is rotated as shown by arrow B, so that the engaging piece 38 is engaged with the engaging hole 24 of the reflector 20.

The side peripheral area 38*b*1 of the head portion 38*b* which is engaged with the peripheral area of the engaging hole 24, is, as seen from FIG. 5, formed into a slightly (by $\theta 1$) inclined shape with respect to the direction Y that is perpendicular to the engaging piece extending direction X. The side peripheral area 38*a*1 of the mounting base portion of the neck portion 38*a* is formed into a slightly (by $\theta 2$) inclined shape with respect to the engaging piece extending direction X. As a result, the engaging piece 38 is easily engaged with the engaging hole 24 by rotation.

The shoulder portion 37*b* (which is the shoulder portion opposite from the shoulder portion 37*a* that faces the side edge 38*b*1 of the head portion 38*b*) is formed into a slightly (by $\theta 3$) inclined square-shouldered shape with reference to direction Y that is perpendicular to the direction X in which the engaging piece extends. In the shoulder portion 37*b* that has the square-shouldered shape, only the tip portion 37*b*1 abuts against the peripheral area 25 of the engaging hole 24, and a dimensional error between the engaging piece 38 and the engaging hole 24 is absorbed.

With the above structure taken for the shoulder portion 37*b*, a suitable engagement between the engaging piece 38 and the engaging hole 24 is assured. The peripheral area 25 of the engaging hole 24 is held in a sandwiched manner in the longitudinal direction by the head portion 38*b* of the engaging piece 38 and the right and left shoulder portions 37*a* and 37*b*. However, in the shoulder portion 37*b* that has the square-shouldered shape, only the tip portion 37*b*1 of the acute-angled shoulder portion abuts against the peripheral area 25 of the engaging hole 24. Accordingly, the holding force onto the peripheral area 25 of the engaging hole 24 with respect to the engaging piece 38 is enhanced; and the engaging piece 38 is secured and prevented from being separated, and thus an engaging force of the lower side (second) leg 36 is enhanced.

In the above-described embodiment, the legs 34 and 36 are formed so as to face each other with the light source in between; and the upper side leg 34 is screw-fastened to the reflector 20, and the lower side leg 36 is engaged with the engaging hole 24 via the engaging piece 38 so as not to be separated from the engaging hole 24. However, another structure can be taken in which the lower side leg 36 is screw-fastened to the reflector 20, and the upper side leg 34 is engaged with the engaging hole via an engaging piece formed thereon.

Also, in the shown embodiment, one leg, which is screw-fastened, and another leg, which is engaged with the engaging hole via its engaging piece, are provided so as to be diametrically opposed each other in a vertical direction with respect to the light source. However, the legs can be provided so as to face each other with respect to the light source in the lateral or horizontal direction or in the diagonal direction.

As seen from the above, according to the present invention, the attachment of a shade on a reflector only requires inserting of the tip portion (engaging piece) of one of the legs into an engaging hole of the reflector and screw-fastening the other leg to the reflector. Thus, the shade can be easily mounted to the reflector.

Since the engaging piece at the tip portion of the leg is secured and prevented from being separated without looseness with respect to the engaging hole, the shade does not rattle in the reflector, and it would not occur that the distribution of the light from the light source is deflected due to vibrations and the like.

In the present invention, the leg that has the engaging piece is engaged with the engaging hole of the reflector smoothly. Accordingly, it is extremely easy to attach the shade to the reflector.

The engaging piece at the tip portion of the leg is secured without getting loosened in the lateral direction with respect to the engaging hole, and the shade does not rattle entirely with respect to the reflector. Accordingly, the distribution of light is not deflected due to vibrations and the like.

In addition, in the present invention, a large holding force by the engaging piece is obtained on the peripheral area of the engaging hole of the reflector. Accordingly, the shade is even more secured without looseness with respect to the reflector; and in this aspect as well, the distribution of light is well prevented from being deflected.

What is claimed is:

1. A vehicle lamp comprising a reflector, which is provided with a light source and is housed in a lamp chamber defined by a lamp body and a front lens, and a shade, which is attached at a leg portion thereof to said reflector so as to be in front of said light source, wherein said leg portion of said shade is comprised of a first leg and a second leg that extend backward respectively so as to sandwich said light source, and said first leg is screw-fastened to said reflector, and said second leg is connected to said reflector by a substantially L-shaped engaging piece that is formed at a tip portion of said second leg and engaged with a peripheral area of an engaging hole formed in said reflector thus being secured so as to be prevented from being separated, said substantially L-shaped engaging piece extends from shoulder portions of said second leg, and a longitudinal length between said shoulder portions to a head portion of said L-shaped engaging piece is substantially equal to a longitudinal length of said engaging hole of said reflector.

2. A vehicle lamp comprising a reflector, which is provided with a light source and is housed in a lamp chamber defined by a lamp body and a front lens, and a shade, which is attached at a leg portion thereof to said reflector so as to be in front of said light source, wherein said leg portion of said shade is comprised of a first lea and a second leg that extend backward respectively so as to sandwich said light source, said first leg is screw-fastened to said reflector, said second leg is connected to said reflector by a substantially L-shaped engaging piece that is formed at a tip portion of said second leg and engaged with a peripheral area of an engaging hole formed in said reflector thus being secured so as to be prevented from being separated, said substantially L-shaped engaging piece extends from shoulder portions of said second leg, a longitudinal length between said shoulder portions to a head portion of said L-shaped engaging piece is substantially equal to a longitudinal length of said engaging hole of said reflector, a width of a mounting base portion of said engaging piece is substantially equal to a width of said engaging hole of said reflector, and one side of said head portion of said engaging piece is formed diagonally to form a slanted edge that allows said engaging piece to be inserted into said engaging hole.

3. The vehicle lamp according to claim 1, wherein said shoulder portions are provided on both aides of said engaging piece, and one of said shoulder portions which is opposed to another one of said shoulder portions that faces said head portion of said L-shaped engaging piece is formed in a square shouldered shape inclined toward a direction perpendicular to a direction in which said L-shaped engaging piece extends.

4. The vehicle lamp according to claim 2, wherein said shoulder portions are provided on both sides of said L-shaped engaging piece, and one of said shoulder portions which is opposed to another one of said shoulder portions that faces said head portion of said L-shaped engaging piece is formed in a square shouldered shape inclined toward a direction perpendicular to a direction in which said L-shaped engaging piece extends.

* * * * *